US009871845B2

United States Patent
Ye et al.

(10) Patent No.: US 9,871,845 B2
(45) Date of Patent: Jan. 16, 2018

(54) PORTLET SCHEDULING WITH IMPROVED LOADING TIME AND LOADING EFFICIENCY

(71) Applicant: International Business Machines Corporation, Armonk, NY (US)

(72) Inventors: Meng Ye, Beijing (CN); Xiao Si Zhou, Beijing (CN)

(73) Assignee: International Business Machines Corporation, Armonk, NY (US)

(*) Notice: Subject to any disclaimer, the term of this patent is extended or adjusted under 35 U.S.C. 154(b) by 248 days.

(21) Appl. No.: 14/721,285

(22) Filed: May 26, 2015

(65) Prior Publication Data

US 2015/0350293 A1    Dec. 3, 2015

(30) Foreign Application Priority Data

May 28, 2014    (CN) .......................... 2014 1 0229741

(51) Int. Cl.
*H04L 29/08*    (2006.01)
*G06F 9/00*    (2006.01)
(Continued)

(52) U.S. Cl.
CPC .............. *H04L 67/02* (2013.01); *G06F 3/048* (2013.01); *G06F 9/00* (2013.01); *G06F 9/445* (2013.01); *G06F 9/46* (2013.01); *G06F 17/30* (2013.01)

(58) Field of Classification Search
CPC . H04L 67/02; G06F 9/00; G06F 9/445; G06F 9/48; G06F 3/048; G06F 17/30
See application file for complete search history.

(56) References Cited

U.S. PATENT DOCUMENTS 7,313,601 B2    12/2007    Fischer et al.
7,475,089 B1    1/2009    Geddes
(Continued)

FOREIGN PATENT DOCUMENTS

CN    103258032 A  *  8/2013

OTHER PUBLICATIONS

"Parallel portlet rendering," IBM WebSphere Portal Enable for z/OS Version 6.1.0, IBM Corporation, Jul. 2011, 4 pages. http://www-01.ibm.com/support/knowledgecenter/SS3NNG_6.1.0/com.ibm.wp.zos.doc/admin/srvcfg_cont_ppr.html.

*Primary Examiner* — Brian J Gillis
*Assistant Examiner* — Steve Lin
(74) *Attorney, Agent, or Firm* — Yee & Associates, P.C.; Richard A. Wilhelm

(57) ABSTRACT

A data processing, and more specifically, to a method and system for portlet scheduling. The method for scheduling a plurality of portlets according to the present invention comprising: obtaining invocation time of the plurality of portlets; obtaining weights of the plurality of portlets; assembling the plurality of portlets into a plurality of threads according to the invocation time and the weights, wherein the assembled plurality of threads has similar thread invocation time. With the method and system for scheduling a plurality of portlets according to illustrative embodiments, the plurality of portlets are assembled into a plurality of threads having similar thread invocation time according to invocation time and importance of each portlet, and the above problems are better solved, thus loading time of the portlets can be significantly reduced, loading efficiency of the portlets can be improved, thereby better improving user experience.

15 Claims, 3 Drawing Sheets

(51) Int. Cl.
*G06F 17/30* (2006.01)
*G06F 3/048* (2013.01)
*G06F 9/445* (2006.01)
*G06F 9/46* (2006.01)

(56) References Cited

U.S. PATENT DOCUMENTS

| | | | |
|---|---|---|---|
| 7,996,757 B2 | 8/2011 | Hind et al. | |
| 8,181,112 B2* | 5/2012 | Jolley | G06F 17/30873 |
| | | | 715/739 |
| 2003/0188163 A1* | 10/2003 | Fischer | H04L 63/08 |
| | | | 713/170 |
| 2011/0078708 A1 | 3/2011 | Dokovski et al. | |
| 2013/0212101 A1* | 8/2013 | Okuno | G06F 17/30867 |
| | | | 707/736 |
| 2014/0053075 A1* | 2/2014 | Katou | G06F 3/0484 |
| | | | 715/738 |
| 2015/0067691 A1* | 3/2015 | Johnson | G06F 9/5016 |
| | | | 718/103 |
| 2015/0143378 A1* | 5/2015 | Lee | G06F 9/5027 |
| | | | 718/103 |
| 2015/0242528 A1* | 8/2015 | Buehler | G06F 17/3089 |
| | | | 707/736 |

\* cited by examiner

PORTLET SCHEDULING WITH IMPROVED LOADING TIME AND LOADING EFFICIENCY

CROSS-REFERENCE TO RELATED APPLICATION(S)

This application claims the benefit of priority to Chinese Patent Application No. 201410229741.7, filed May 28, 2014, the entire contents of which are incorporated herein by reference.

BACKGROUND

The present invention relates to data processing, and more specifically, to a method and system for portlet scheduling.

A portal server is a platform forming a portal page by aggregating content that is in unit of portlet. Current mechanism for portlet loading is in a single-threaded manner, that is, all portlets within a portal page are sequentially loaded one after another before being aggregated. Such single-threaded manner makes loading of portlets time-consuming and inefficient, which seriously affects user experience.

SUMMARY

In view of the above problems in the prior art, the present invention provides a method and system for scheduling a plurality of portlets, which can significantly reduce loading time of portlets, improve loading efficiency of portlets, thereby better improving user experience.

An illustrative embodiment of the present invention provides a scheduling method for a plurality of portlets, comprising: obtaining invocation time of the plurality of portlets; obtaining weights of the plurality of portlets; assembling the plurality of portlets into a plurality of threads according to the invocation time and the weights, wherein the assembled plurality of threads has similar thread invocation time with each other, and a portlet with large weight in each of the plurality of threads will be executed preferentially.

An illustrative embodiment of the present invention provides a scheduling system for a plurality of portlets, comprising: an obtaining means configured to obtain invocation time and weights of the plurality of portlets; an assembling means configured to assemble the plurality of portlets into a plurality of threads according to the invocation time and the weights, wherein the assembled plurality of threads has similar thread invocation time with each other, and a portlet with large weight in each of the plurality of threads will be executed preferentially.

With the method and system for scheduling a plurality of portlets according to illustrative embodiments, the plurality of portlets are assembled into a plurality of threads having similar thread invocation time according to invocation time and importance of each portlet, and the above problems are better solved, thus loading time of the portlets can be significantly reduced, loading efficiency of the portlets can be improved, thereby better improving user experience.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
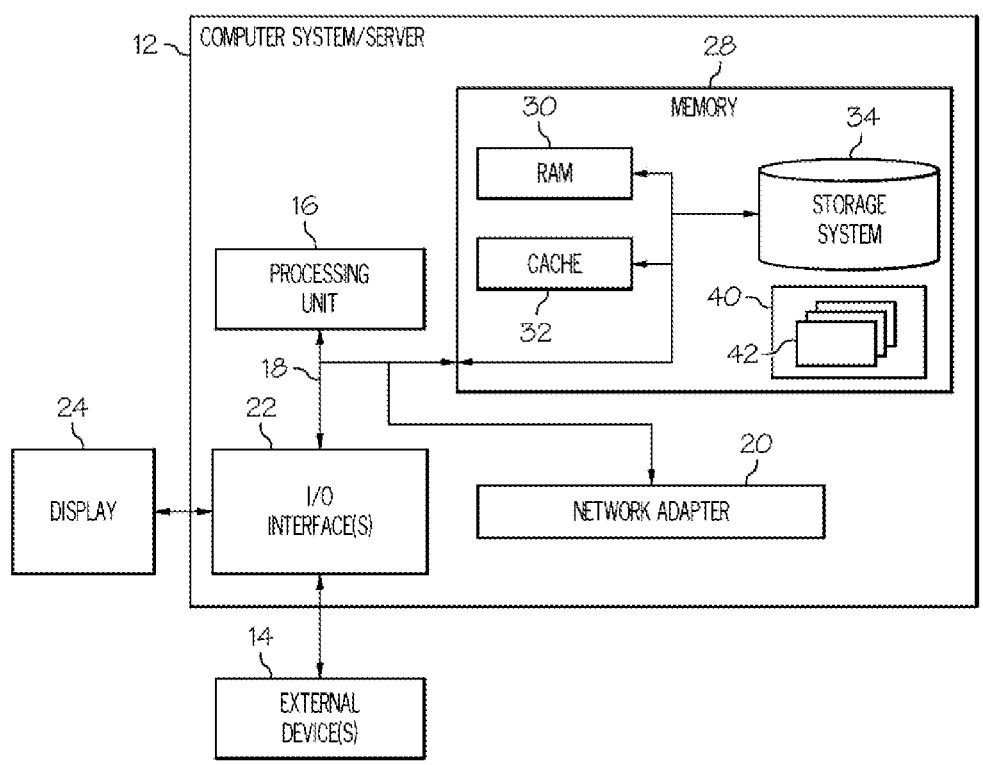
FIG. 1 shows a block diagram of an exemplary computer system/server 12 which is applicable to implement the embodiments of the present invention.

Referring now to FIG. 1, in which a block diagram of an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In addition to conventional computer system/server 12 shown in FIG. 1, mobile electric device may also be included for achieving embodiment of the invention, including but not limited to, mobile telephone, PDA, tablet computer and others. Typically, mobile electric device has input device, including but not limited to, touch input device, such as, touch screen, touch panel and others.

Next, terms involved in the present invention will be described.

Portal: is a Web-based application, typically can provide personalization, single sign-on, content aggregation from different sources and centralization of presentation layers of an information system. Aggregation is a process of integrating source data from different web pages.

Portal page: a portal page per se represents a complete markup document, and is generally formed by aggregating a plurality of portlets. A portal page generally contains a plurality of windows corresponding to the portlets, and may also contain a navigation area and a flag area besides the windows corresponding to the portlets. The window corresponding to portlet generally contains a header bar, decorations and content generated by the portlet. A portal page may contain complex personalized features, and portal pages with personalized content created for different users may contain different sets of portlets. A portal page handles request from a client, retrieves portlets within the current page, then invokes a portlet container, and fetches content of each portlet.

Portlet: is a Java-based Web component managed by a portlet container, and the container handles request and generates dynamic content. The content generated by a portlet is referred to as a fragment, i.e. a piece of markup (such as html, xhtml or wml, etc.) following a central rule. Multiple fragments may be aggregated into a complete document. Multiple portlets are aggregated together into a portal page, and lifecycle of the portlets are controlled by the portlet container.

Portlet container: used to provide a runtime environment required by portlets and run the portlets, it contains the portlets and controls their lifecycles. A portlet container provides a persistent storage mechanism of portlet parameters, accepts request from a portal page, and executes the request on its held portlets. A portlet container is not responsible for aggregation of content generated by the portlets, rather, aggregation of content is handled by the portal page itself.

Thread: is a basic unit capable of being run independently, and is also a basic unit for independent scheduling and dispatching.

Figure 2:
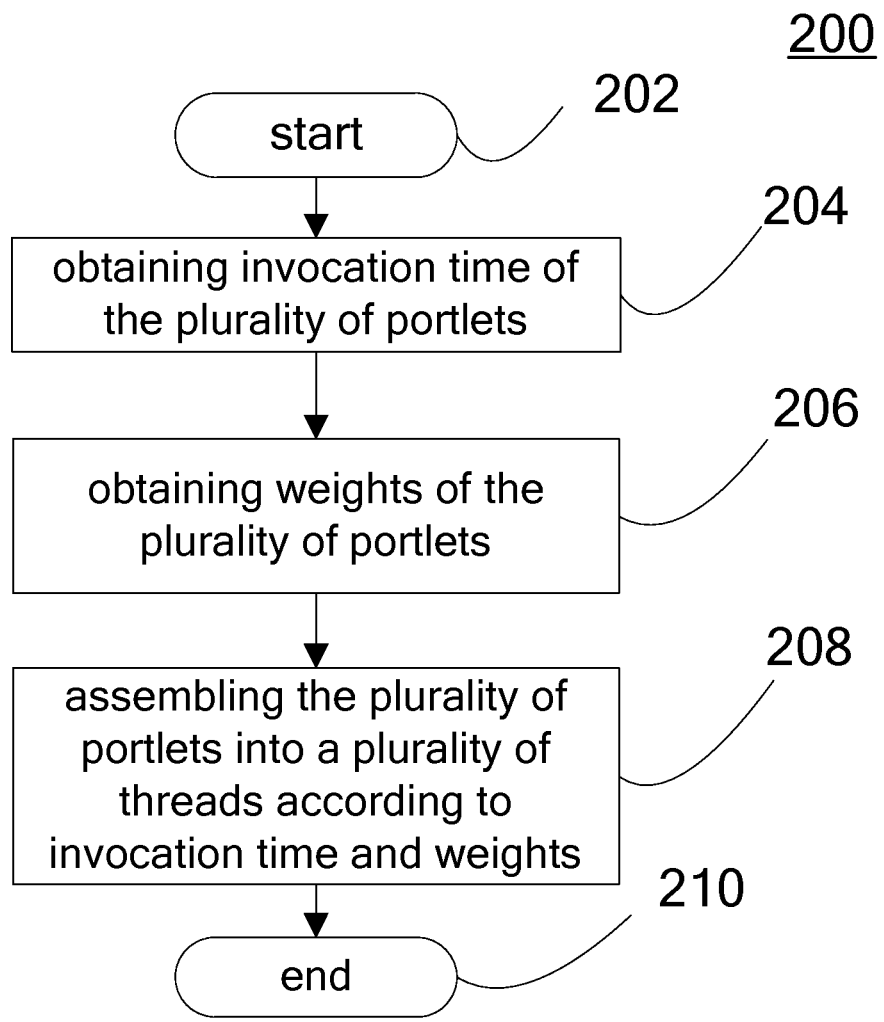
FIG. 2 shows a flowchart of a method 200 for scheduling a plurality of portlets according to one embodiment of the present invention.

Next, referring to FIG. 2, a flowchart of a method 200 for scheduling a plurality of portlets according to one embodiment of the present invention is shown. The method 200 is generally performed in a portlet container and is used to schedule a plurality of portlets.

According to one embodiment of the present invention, the method 200 for scheduling a plurality of portlets starts at step 202. Then the method 200 proceeds to step 204, obtaining invocation time of the plurality of portlets. Each of the plurality of portlets has its corresponding invocation time. According to one embodiment of the present invention, the invocation time may be determined based on historical invocation time of the plurality of portlets. Assuming there are n portlets $\{P1, P2, \ldots, Pn\}$, then corresponding invocation time may be represented as $\{T1, T2, \ldots, Tn\}$. According to one embodiment of the present invention, the invocation time $\{T1, T2, \ldots, Tn\}$ of the plurality of portlets may be a weighted average of multiple invocation time of each portlet $\{P1, P2, \ldots, Pn\}$ during a historical period. According to one embodiment of the present invention, the invocation time $\{T1, T2, \ldots, Tn\}$ of the plurality of portlets may also be invocation time of each portlet $\{P1, P2, \ldots, Pn\}$ at a previous historical moment. It should be appreciated that, the two scenarios given above are merely for illustration purpose, and invocation time of the portlets may be determined by using any suitable manner in the art, as long as the determined invocation time of the portlets can truly reflect elapsed time for invocation of the portlets to some extent. The invocation time of the portlets may be dynamically calculated in response to a request for obtaining invocation time of the plurality of portlets, and may also be pre-calculated and stored at a certain location in the network, such as in a memory coupled with a portlet container, such that invocation time of the plurality of portlets can be returned as a response to the request for obtaining invocation time of the plurality of portlets.

Then, the method 200 proceeds to step 206, obtaining weights of the plurality of portlets. Each of the plurality of portlets has its corresponding weight. According to one embodiment of the present invention, the weights may be determined according to importance of the plurality of portlets to user of a client browser. Assuming there are n portlets $\{P1, P2, \ldots, Pn\}$, then corresponding weights may be represented as $\{W1, W2, \ldots, Wn\}$. According to one embodiment of the present invention, the weights $\{W1, W2, \ldots, Wn\}$ of the plurality of portlets may be determined based on a statistical method according to behavioral habit of a user during a historical period. For example, a portlet having frequent interactions with the user during that historical period will have higher weight. According to one embodiment of the present invention, the weights {W1, W2, ..., Wn} of the plurality of portlets may be weighted values of each portlet {P1, P2, ..., Pn} at a previous historical moment. It should be appreciated that, the two scenarios given above are merely for illustration purpose, and weights of the portlets may be determined by using any suitable manner in the art, as long as the determined weights of the portlets can truly reflect importance of the portlets to a user to some extent. The weights of the portlets may be dynamically calculated in response to a request for obtaining weights of the plurality of portlets, and may also be pre-calculated and stored at a certain location in the network, such as in a memory coupled with a portlet container, such that weights of the plurality of portlets can be returned as a response to the request for obtaining weights of the plurality of portlets.

It should be appreciated that, steps 204 and 206 need not be performed strictly in the order described above, execution order of steps 204 and 206 may be reversed, or they may be performed simultaneously. According to one embodiment of the present invention, obtaining the invocation time and the weights of the plurality of portlets mentioned above may be performed in response to a request of a client browser for the plurality of portlets.

After going through steps 204 and 206, the obtained invocation time and weights of the plurality of portlets may be represented by the following array sequence:

{P1(W1, T1), P2(W2, T2), ..., Pn(Wn, Tn)},

Wherein each array of each sequence in the array represents one portlet and its corresponding invocation time and weight.

Then, the method 200 proceeds to step 208, assembling the plurality of portlets into a plurality of threads according to the invocation time and the weights, wherein the assembled plurality of threads has similar thread invocation time with each other, and a portlet with large weight in each of the plurality of threads will be executed preferentially. According to one embodiment of the present invention, at least part of the plurality of portlets may be allocated into the plurality of threads according to the weight of each of the plurality of portlets. Specifically, the plurality of portlets may be sorted in descending order according to the weights, then, in an order that weights are from large to small, a plurality of portlets among the plurality of portlets sorted in descending order whose number is the same as that of the plurality of threads is obtained, and the obtained plurality of portlets are sequentially allocated into the plurality of threads. Further, remaining portlets are assembled into the plurality of threads according to the invocation time, such that the assembled plurality of threads has similar thread invocation time. According to one embodiment of the present invention, information about network transmission condition between a portal server and a portlet container may also be obtained, and the plurality of portlets are assembled into the plurality of threads further according to the information about network transmission condition.

The above process will be described below in conjunction with a specific example. It should be appreciated that, the following are merely illustrative, and should not be considered as to limit protection scope of the present invention.

Assuming there are 8 portlets {P1, P2, P3, P4, P5, P6, P7, P8} in total, i.e. n=8, and there are 4 threads {T1, T2, T3, T4}.

Correspondingly, invocation time (in unit of ms) of each portlet is {10, 9, 1, 6, 4, 5, 3, 1};

Correspondingly, weight of each portlet is {W1, W2, W3, W4, W5, W6, W7, W8}. Here, for ease of description, it is assumed that W1>W2>W3>W4>W5>W6>W7>W8.

After going through steps 204 and 206, the obtained invocation time and weights of the plurality of portlets may be represented by the following array sequence: {P1(W1, 10), P2(W2, 9), P3(W3, 1), P4(W4, 6), P5(W5, 4), P6(W6, 5), P7(W7, 3), P8(W8, 1)}.

According to one embodiment of the present invention, first, a plurality of portlets are allocated into the 4 threads according to the weights. Specifically, the 8 portlets are sorted in descending order according to the weights, and the obtained 8 portlets sorted in descending order are {P1, P2, P3, P4, P5, P6, P7, P8}.

Then, in an order that weights are from large to small, a plurality of portlets among the plurality of portlets sorted in descending order whose number is the same as that of the plurality of threads is obtained, and the obtained plurality of portlets is sequentially allocated into the plurality of threads. As to the example given above, there are 4 threads. Therefore, 4 portlets sorted in descending order are obtained in an order that weights are from large to small, i.e. {P1, P2, P3, P4}. Then the 4 portlets are sequentially allocated into the 4 threads. After the above processing, condition of corresponding 4 threads is as shown in Table 1:

TABLE 1

| Thread ID | Assembled portlet (weight, invocation time) |
|---|---|
| T1 | P1(W1, 10) |
| T2 | P2(W2, 9) |
| T3 | P3(W3, 1) |
| T4 | P4(W4, 6) |

In the above table, each row represents one thread, and a portlet assembled into that thread is represented in form of {portlet ID (weight, invocation time)}.

Further, remaining portlets are assembled into the plurality of threads according to the invocation time, such that the assembled plurality of threads has similar thread invocation time. As to the example given above, the remaining portlets {P5, P6, P7, P8} are assembled into the 4 threads according to their respective invocation time, such that the assembled 4 threads have similar thread invocation time. After the above processing, condition of corresponding 4 threads is as shown in Table 2:

TABLE 2

| Thread ID | Assembled Portlet(weight, invocation time) |
|---|---|
| T1 | P1(W1, 10,) |
| T2 | P2(W2, 9), P8(W8, 1) |
| T3 | P3(W3, 1), P5(W5, 4), P6(W6, 5) |
| T4 | P4(W4, 6), P7(W7, 3) |

In Table 2, each row represents one thread, and a portlet assembled into that thread is represented in form of {portlet ID (weight, invocation time)}. It can be seen that, the processed 4 threads have similar invocation time: in which invocation time of T1, T2 and T3 is 10 ms, and invocation time of T4 is 9 ms. In addition, since weights of the portlets are first considered in the process of assembling, a portlet with higher weight will be scheduled first: wherein the portlets {P1, P2, P3, P4} with higher weights will be scheduled first.

It can be seen from the above detailed description that, since a plurality of portlets is assembled into a plurality of threads having similar thread invocation time according to invocation time and importance of each portlet, the problems in prior art are better solved by the present invention, thus loading time of the portlets can be significantly reduced, loading efficiency of the portlets can be improved, thereby better improving user experience.

Figure 3:
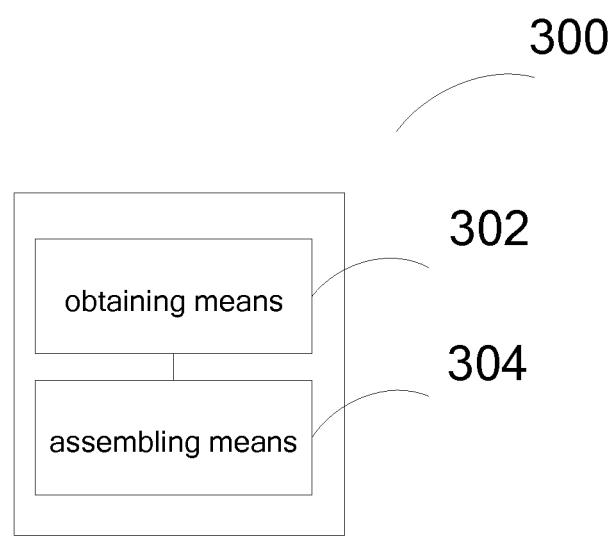
FIG. 3 shows a block diagram of a system 300 for scheduling a plurality of portlets according to one embodiment of the present invention.

Next, referring to FIG. 3, a block diagram of a system 300 for scheduling a plurality of portlets according to one embodiment of the present invention is shown.

According to one embodiment of the present invention, the syetem 300 for scheduling a plurality of portlets comprising: an obtaining means 302 configured to obtain invocation time and weights of the plurality of portlets; an assembling means 304 configured to assemble the plurality of portlets into a plurality of threads according to the invocation time and the weights, wherein the assembled plurality of threads has similar thread invocation time with each other, and a portlet with large weight in each of the plurality of threads will be executed preferentially. Each of the plurality of portlets has its corresponding invocation time. According to one embodiment of the present invention, the invocation time may be determined based on historical invocation time of the plurality of portlets. Each of the plurality of portlets has its corresponding weight. According to one embodiment of the present invention, the weights may be determined according to importance of the plurality of portlets to user of a client browser. This has been described above and will not be repeated herein.

According to one embodiment of the present invention, the obtaining means 302 performs the obtaining in response to a request of a client browser for the plurality of portlets.

According to one embodiment of the present invention, the assembling means 304 is further configured to allocate at least part of the plurality of portlets into the plurality of threads according to the weights. Specifically, the assembling means 304 is further configured to: sort the plurality of portlets in descending order according to the weights; obtain, in an order that weights are from large to small, a plurality of portlets among the plurality of portlets sorted in descending order whose number is the same as that of the plurality of threads; allocate the obtained plurality of portlets into the plurality of threads sequentially.

According to one embodiment of the present invention, the assembling means 304 is further configured to: assemble remaining portlets into the plurality of threads according to the invocation time, such that the assembled plurality of threads has similar thread invocation time.

According to one embodiment of the present invention, the obtaining means 302 is further configured to obtain information about network transmission condition between a portal server and a portlet container; and the assembling means 304 is further configured to assemble the plurality of portlets into the plurality of threads further according to the information about network transmission condition.

A method and system for information processing according to embodiments of the invention have been described above in conjunction with accompany drawings. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A scheduling method for a plurality of portlets, comprising:
    obtaining invocation time of the plurality of portlets;
    obtaining weights of the plurality of portlets;
    assembling the plurality of portlets into a plurality of threads according to the invocation time and the weights, wherein the assembled plurality of threads has similar thread invocation time with each other, and a portlet with large weight in each of the plurality of threads will be executed preferentially; and
    scheduling execution of the plurality of threads to form a portal page comprising the plurality of portlets aggregated with one another on a display of a computer system, wherein the step of assembling the plurality of portlets into a plurality of threads according to the invocation time and the weights further comprises:
    allocating at least part of the plurality of portlets into the plurality of threads according to the weights, and wherein the step of allocating at least part of the plurality of portlets into the plurality of threads according to the weights further comprises:
    sorting the plurality of portlets in descending order according to the weights;
    obtaining, in an order that weights are from large to small, a plurality of portlets among the plurality of portlets sorted in descending order whose number is the same as that of the plurality of threads; and
    allocating the obtained plurality of portlets into the plurality of threads sequentially.

2. The method according to claim 1, wherein:
    the invocation time is determined based on historical invocation time of the plurality of portlets.

3. The method according to claim 1, wherein:
    the weights are determined according to importance of the plurality of portlets to user of a client browser.

4. The method according to claim 1, further comprising:
    assembling remaining portlets into the plurality of threads according to the invocation time, such that the assembled plurality of threads has similar thread invocation time with each other.

5. The method according to claim 1, further comprising:
    obtaining information about network transmission condition between a portal server and a portlet container; and
    assembling the plurality of portlets into the plurality of threads further according to the information about the network transmission condition.

6. A scheduling system for a plurality of portlets, comprising:
    an obtaining module configured to obtain invocation time and weights of the plurality of portlets;
    an assembling module configured to assemble the plurality of portlets into a plurality of threads according to the invocation time and the weights, wherein the assembled plurality of threads has similar thread invocation time with each other, and a portlet with large weight in each of the plurality of threads will be executed preferentially; and
    a display of a computer system configured to display a portal page formed by scheduling execution of the plurality of threads, wherein the portal page comprises the plurality of portlets aggregated with one another on the display, wherein the assembling module is further configured to:
    allocate at least part of the plurality of portlets into the plurality of threads according to the weights;
    sort the plurality of portlets in descending order according to the weights;
    obtain, in an order that weights are from large to small, a plurality of portlets among the plurality of portlets sorted in descending order whose number is the same as that of the plurality of threads; and
    allocate the obtained plurality of portlets into the plurality of threads sequentially.

7. The system according to claim 6, wherein:
the invocation time is determined based on historical invocation time of the plurality of portlets.

8. The system according to claim 6, wherein:
the weights are determined according to importance of the plurality of portlets to user of a client browser.

9. The system according to claim 6, wherein the assembling module is further configured to:
assemble remaining portlets into the plurality of threads according to the invocation time, such that the assembled plurality of threads has similar thread invocation time with each other.

10. The system according to claim 6, wherein:
the obtaining module is further configured to obtain information about network transmission condition between a portal server and a portlet container; and
the assembling module is further configured to assemble the plurality of portlets into the plurality of threads further according to the information about the network transmission condition.

11. An article of manufacture comprising a non-transitory computer readable storage medium embodying program instructions configured to cause a computing system to perform the method according to claim 1 when the computer instructions are executed on the computing system.

12. The method according to claim 1, wherein:
the weights are determined according to behavioral habit of user of a client browser during a historical period.

13. The method according to claim 1, wherein:
obtaining the invocation time and the weights is performed responsive to a request of a client browser for the plurality of portlets.

14. The system according to claim 6, wherein:
the weights are determined according to behavioral habit of user of a client browser during a historical period.

15. The system according to claim 6, wherein:
obtaining the invocation time and the weights by the obtaining means is performed responsive to a request of a client browser for the plurality of portlets.

* * * * *